United States Patent [19]

Wright et al.

[11] E Patent Number: Re. 32,879

[45] Reissued Date of Patent: Feb. 28, 1989

[54] TAMPER INDICATING SCREW CAP

[75] Inventors: David M. Wright; Edward Luker, both of Evansville, Ind.

[73] Assignee: Sunbeam Plastics Corporation, Evansville, Ind.

[21] Appl. No.: 162,294

[22] Filed: Feb. 24, 1988

Related U.S. Patent Documents

Reissue of:

[64] Patent No.: 4,572,388
Issued: Feb. 25, 1986
Appl. No.: 713,327
Filed: Mar. 18, 1985

[51] Int. Cl.[4] ..... B65D 41/34
[52] U.S. Cl. ..... 215/252
[58] Field of Search ..... 215/252

[56] References Cited

U.S. PATENT DOCUMENTS

| | | | |
|---|---|---|---|
| 4,190,169 | 2/1980 | Pehr | 215/252 |
| 4,196,818 | 4/1980 | Brownbill | 215/252 |
| 4,241,842 | 12/1980 | Toeppen | 215/252 |
| 4,401,227 | 8/1983 | Pehr | 215/252 |
| 4,402,418 | 9/1983 | Ostrowsky | 215/252 |
| 4,478,343 | 10/1984 | Ostrowsky | 215/252 |

*Primary Examiner*—Donald F. Norton
*Attorney, Agent, or Firm*—Irvin L. Groh; Alfred L. Patmore, Jr.

[57] ABSTRACT

A threaded one piece closure having a tamper indicating band attached to the lower end of a cap skirt by frangible bridges which fracture upon the initial opening of the closure leaving the detached band on the container indicating the initial opening or tampering. The bottom of the tamper indicating band is formed with a plurality of equally spaced stop segments attached by flexible webs. The tamper indicating band is also formed with a plurality of rectangular windows in line with the stop segments. The flexible webs permit the swinging of the stop segments into an operative position engaged within the windows so that they will coact with a flange or ratchet teeth on the container to provide a means for fracturing the frangible bridges upon unthreading of the cap.

20 Claims, 3 Drawing Sheets

TAMPER INDICATING SCREW CAP

Matter enclosed in heavy brackets [ ] appears in the original patent but forms no part of this reissue specification; matter printed in italics indicates the additions made by reissue.

This invention relates to tamper indicating closures, and, more particularly, to closures in which a threaded cap and a tamper indicating band are formed as a single piece and separate from each other upon the initial opening of the container, the separated ring remaining around the container neck as evidence that the container has been tampered or initially opened.

Tamper indicating closures of the type having a separable ring or band which remains on the container after the initial opening of the container to indicate tampering have been provided in various forms. In one form, the closure is applied in at least two steps, one of which requires the application of heat after the closure has been applied to a filled container to deform the lower end of a skirt to lock the container into position. In another form of one-piece tamper indicating closure, the closure and separable ring must be axially aligned to transmit the capping or closing forces to prevent premature separation of the ring or band from the closure. Such constructions, however, are extremely difficult to mold and require complex molds and molding procedures. In an attempt to simplify the mold and molding procedure, the locking mechanism which produces the separation of the band from the cap skirt upon unthreading, has been molded as an additional band or a plurality of spaced apart tabs which are attached to the lower portion of the tamper indicating band, which tabs or band must be folded upwardly inside the tamper indicating band before the application of the closure to the container. Bending upwardly of a unitary flange requires considerable force and when separate tabs are used, the retention of them in the upwardly folded position presents additional problems requiring special handling prior to threading the cap on the container. Once the stop ring or tabs have been folded into their used position, there remains the problem of premature web breakage as the stop surfaces contact the container stop surfaces during application.

It is an object of this invention to provide a threaded cap with a separable tamper indicating band and foldable stop segments which simplify the molding process without unduly complicating the handling process prior to application of the cap to the container.

It is another object of this invention to provide a threaded cap with a separable tamper indicating band and foldable stop elements of a design which minimizes the fracturing force on the frangible webs during application of the cap to the container.

The objects of this invention are accomplished by a single piece closure taking the form of a threaded cap having a flat top and a first cylindrical skirt portion which extends from the top and has internal threads which are complementary to the container threads. A second annular skirt portion which has a larger diameter than the first annular skirt portion extends downwardly therefrom. A tamper indicating band is spaced from the bottom of the second annular skirt portion and is joined to the bottom of the second skirt portion by a plurality of circumferentially spaced axially extending frangible bridges. A plurality of circumferentially spaced rectangular windows are formed in the band between the upper and lower edges thereof. These windows have horizontal tops and bottoms and vertical sides. A plurality of circumferentially spaced stop segments extend radially outward from the bottom of the tamper indicating band and are joined to it by a plurality of flexible webs which connect each of the stop segments to the bottom of the tamper indicating band in line with one of the rectangular windows. The flexible webs permit the swinging of the stop segments inwardly and upwardly to individually engage the windows for retention of the segments in operative position for threading of the cap onto the container. A flange on the segment engages the bottom of the window and the inside of the tamper indicating band while an upper planar surface on the segment engages the top of the window. As the cap is assembled or threaded onto the container, the stop segments pass over the container bead and the flexible web allows the segment to be pushed further into the window to reduce the force needed to push it down over the bottle bead. As the segment passes over the bead, the upper planar surface of the segment will snap under the container bead. When the cap is rotated in an unthreading direction, the engagement of the stop segments with the container bead will prevent movement of the band causing fracture of the frangible bridges leaving the tamper indicating band on the container neck after the cap has been completely removed.

In another embodiment, the rectangular windows are formed in the band with a horizontal bottom and vertical sides which intersect the upper edge of the band. With this open top window structure the lower edge of the second annular skirt portion acts as the top of the window which the upper planar surfaces of the stop segments engage as the segments are swung inwardly and upwardly inside the tamper indicating band and into engagement with the windows.

The container may have a plurality of outwardly projecting ratchet teeth below the threaded neck instead of the outwardly extending circumferential flange. The ratchet teeth will have radially extending stop surfaces and ramps diverging from the neck outwardly to the stop surfaces. As the cap is assembled to the container, the stop segments will pass over the ramp surfaces on the ratchet teeth and when the cap is unthreaded, the stop segments will engage the radial stop surfaces on the container ratchet teeth preventing rotation of the band which causes the fracture of the frangible bridges and leaves the taper indicating band on the container after the cap has been removed. The stop segments can have ramp surfaces which correspond to the container ratchet teeth ramp surfaces to reduce the force required to thread the cap onto the container.

In still another embodiment, the container can have an outwardly extending flange below the neck threads and outwardly projecting ratchet teeth below the flange. In this case the stop segments will pass over both the container flange and the ratchet teeth and be retained by both during the unthreading of the cap from the container.

The preferred embodiments for the invention are illustrated in the drawing in which:

FIG. 4 is a fragmentary sectional view showing the stop segment as it initially contacts the container bead;

FIG. 5 is a view similar to FIG. 4 showing the stop segment being pushed into the window as it passes the maximum diameter of the container flange;

FIG. 6 shows the stop segment snapped over the container flange showing the height of the cap as viewed along line 6—6 of FIG. 1 with the container added;

Figure 1:
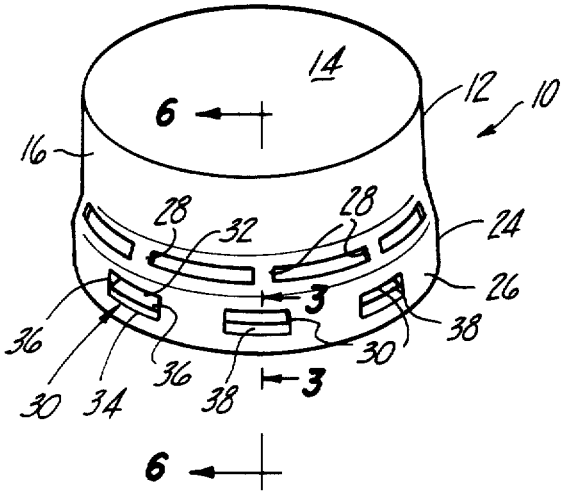
FIG. 1 is a perspective view of the closure molded as a one piece cap with the windows formed completely within the upper and lower edges of the tamper indicating bands.
Figure 2:
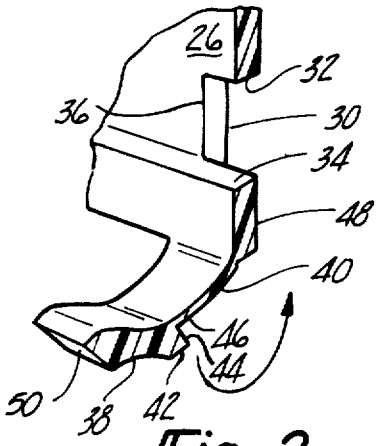
FIG. 2 is a fragmentary perspective view of the lower portion of the tamper indicating band of FIG. 1 showing a window and a stop segment as it extends radially outward from the bottom of the tamper indicating band in the as-molded condition.
Figure 6:
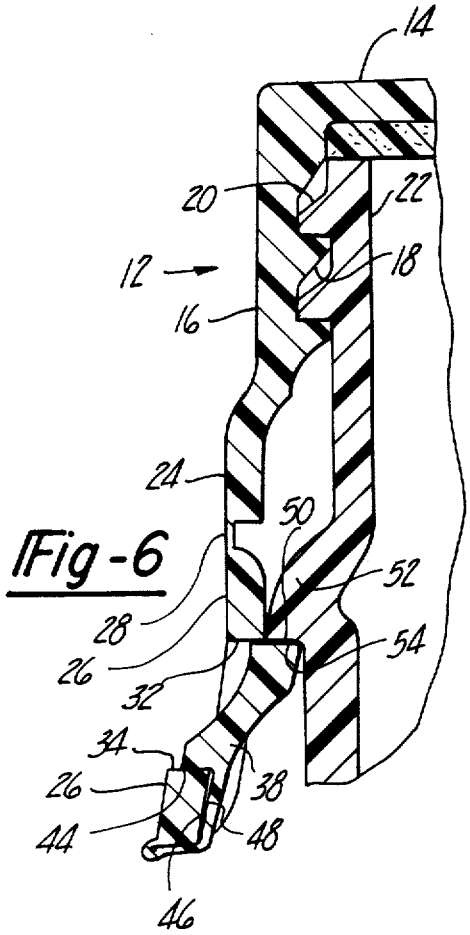

Referring to FIG. 1, the closure 10 includes a one piece cap 12 having a flat top 14 and a first annular skirt 16 extending downwardly from top 14 having internal threads 18 which will engage complementary threads 20 on container neck 22—see FIG. 6. A second annular skirt portion 24 flares outwardly from the bottom of the first annular skirt 16, the larger diameter allowing the cap to clear container threads 20. The tamper indicating band 26 is spaced from the bottom of the second annular skirt and is connected thereto by a plurality of equally spaced axially extending frangible bridges 28 extending around the circumference of the cap. Tamper indication is given by the fracture of frangible bridges 28 when the cap is initially unthreaded from its packaged condition, leaving the tamper indicating band 26 on the container neck as the cap is removed.

A plurality of equally spaced rectangular windows 30 are located around the circumference of the band 26 having top and bottom edges 32 and 34 between the upper and lower edges of the band. Vertical side edges 36 join the top edge 32 and bottom edge 34 of window 30 which in this embodiment is completely defined within the tamper indicating band. The windows 30 are aligned with the frangible webs 28, and as shown in FIG. 1, there are eight equally spaced bridges and windows although another number of equally spaced bridges and windows can be used.

Figure 3:
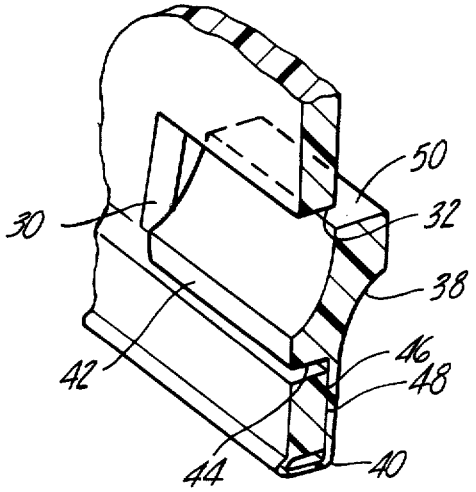
FIG. 3 is a fragmentary perspective view similar to FIG. 2 taken along line 3—3 of FIG. 1 showing the stop segment swung inwardly and upwardly from its as-molded position to its position retained within the window preparatory to assembling the cap to the container.

Attached to the lower end of the tamper indicating band 26 is a plurality of outwardly extending, equally spaced stop segments 38 which are joined to the bottom of band 30 by a substantially horizontally disposed flexible web 40 which is aligned with one of the windows 30. Molding the stop segments 38 in an outwardly extending position greatly simplifies the molding die and technique. Flexible web 40 is of such a length and flexibility that the stop segments 38 can be rotated approximately 270 degrees to engage windows 30. That is, the flexible webs 40 permit the swinging of the stop segments 38 inwardly and upwardly so that flange 42 engages window 30 with flange surface 44 in contact with window bottom 34 and flange surface 46 in contact with the inside diameter 48 of the tamper indicating band 26 as shown in FIG. 3. Upper planar surface 50 of stop segment 38 engages the top edge 32 of window 30, thus retaining the stop segment 38 in operative position for the application of cap 12 to container neck 22.

Figure 4:
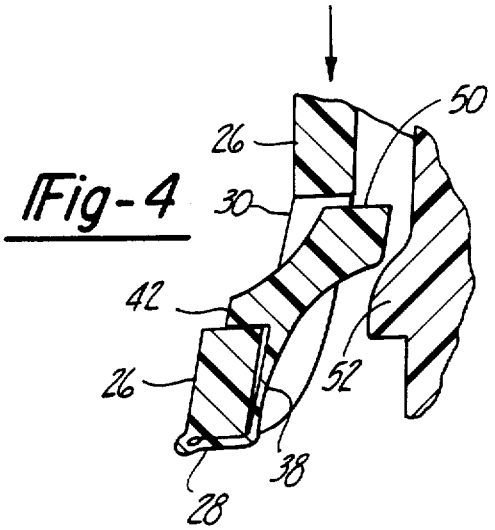
FIGS. 4–6 are fragmentary elevational views showing the position of the stop segment relative to the container bead as the closure is being assembled to the container as follows.
Figure 5:
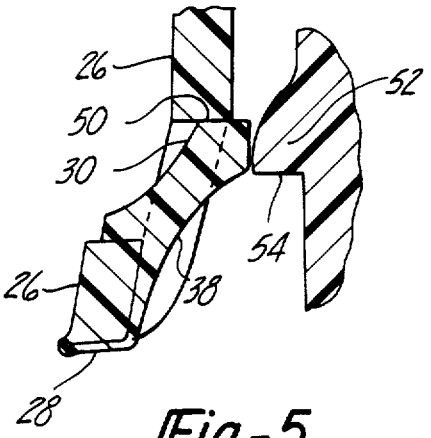

As cap 12 is placed over container neck 22 the inside diameter of second annular skirt 24 and the stop segments 38 clear the container threads 20, and as cap threads 18 engage container threads 20 as the cap is threaded on, the stop segments 38 will engage the outer periphery of container flange 52 as shown in FIG. 4. Further threading will force the upper end of the stop segments 38 into the windows 30 reducing the amount of force necessary to move the stop segments 38 past the container flange 52 as shown in FIG. 5. As the stop segments 38 pass over the container flange 52 they will snap inwardly with the radially inward portion of upper planar surface 50 engaging bottom surface 54 of container flange 52 as shown in FIG. 6.

Upon rotation of cap 12 in an unthreading direction, the engagement of stop segments 38 at their upper planar surfaces 50 with the container flange 52 at its bottom surface 54 will prevent movement of the band 26 thus causing fracture of frangible bridges 28 leaving the tamper indicating band 26 on the container neck 22 as cap 12 is threadingly removed.

Figure 7:
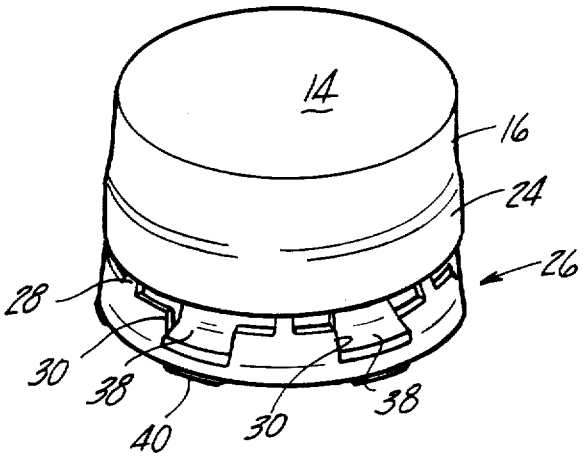
FIG. 7 is a perspective view of another embodiment of the closure in which the windows are formed with their vertical sides intersecting the top of the tamper indicating band.
Figure 8:
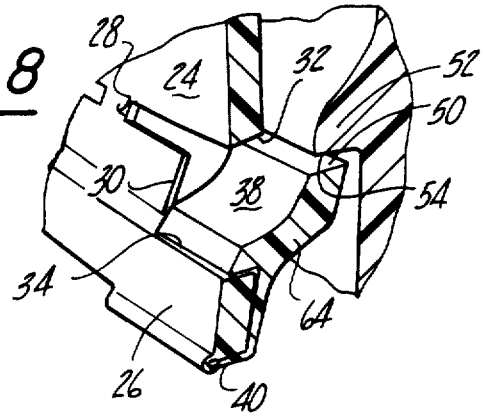
FIG. 8 is a fragmentary perspective view of the lower portion of the tamper indicating band showing the stop segment fully engaged with the container bead.
Figure 9:
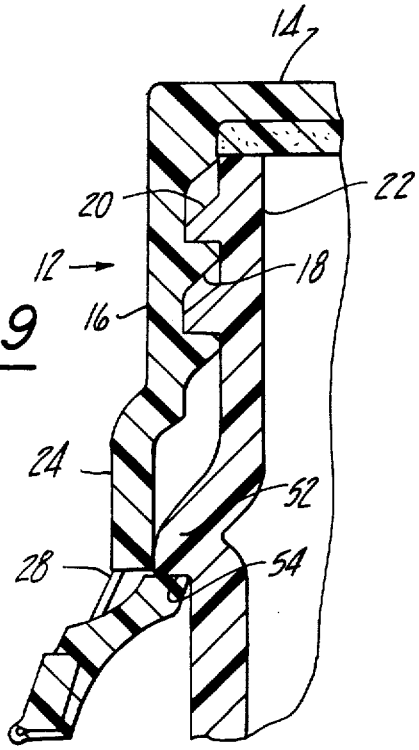
FIG. 9 is a fragmentary elevational view in sections as viewed along line 9—9 of FIG. 7 and also showing the container neck in full engagement with the closure.

The embodiments of FIGS. 7–9 are substantially the same as the embodiments of FIGS. 1–6 except that the rectangular windows 30 are not completely formed within the tamper indicating band 26. The bottom edge 34 is formed within the band 26 and the side edges 36 of the windows 30 extend upward and intersect the upper edge of the band 26 so that the top edge 32 of window 30 is formed by the bottom edge of the second annular skirt 24. As can best be seen in FIG. 8, when the stop segments 38 have been swung into operative position, the top planar surface 50 engages the bottom surface of the second annular skirt 24 at the top edge 32 of window 30.

Figure 10:
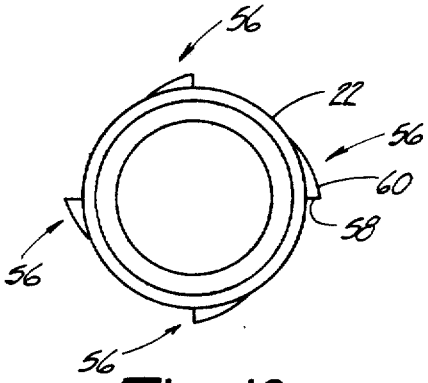
FIG. 10 is a top view of a container having ratchet teeth.
Figure 11:
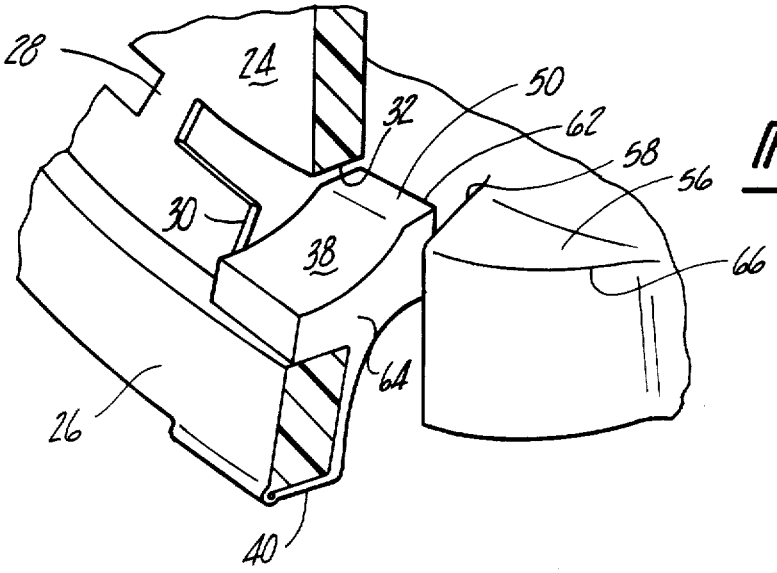
FIG. 11 is a fragmentary perspective view similar to FIG. 8 but showing stop segment engaged with a stop surface on one of the ratchet teeth of FIG. 10.

In FIG. 10, the container neck shows the outwardly projecting stop means to be in the form of equally spaced ratchet teeth 56 which replaces the annular flange 52 shown in FIGS. 1 through 9. Ratchet teeth 56 have radially extending stop surfaces 58 and ramp surfaces 60 which extend from the outer neck surface diverging outwardly to the stop surfaces 58. In their operative position, the inner surface of stop segments 38 can be formed with a ramp surface 62 which cooperates with ratchet tooth ramp surface 60 so that as the cap 12 is being threaded onto container neck 22 the segments 38 will pass past ratchet teeth 56 with a minimum of torque required by the interaction of ramp surfaces 60 and 62. Upon rotation of the cap 12 in an unthreading direction, the radial stop surfaces 64 of stop segment 38 will engage the stop surfaces 58 of container ratchet teeth 56 preventing rotation of the tamper indicating band 26 causing fracture of the frangible bridges 28, again leaving the tamper indicating band on the container after the cap has been threadingly removed. The windows 30 are shown as open top windows with the bottom of the second annular skirt providing the top surface 32 of the window. The windows could just as well be completely formed within the tamper indicating band 26 as shown in the embodiment of FIGS. 1–6. FIG. 10 shows that the container 22 has four ratchet teeth 56, and the cap 12 may have an equal number of stop segments 38 with corresponding windows 30 or there may be eight equally spaced stop segments 38 so as to selectively engage the four ratchet teeth 56.

Figure 12:
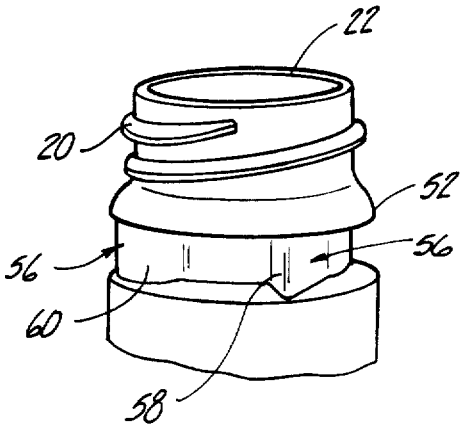
FIG. 12 is a fragmentary perspective view of a bottle having an outwardly extending flange below the external neck threads and ratchet teeth below the flange.
Figure 13:
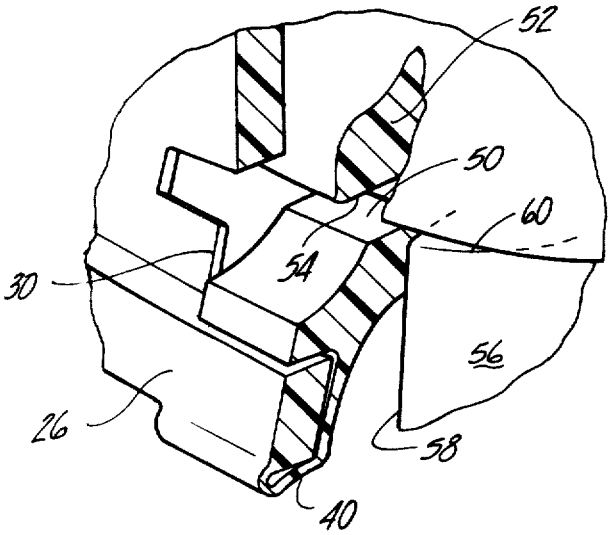
FIG. 13 is a fragmentary perspective view similar to FIGS. 11 and 8 but showing engagement of a stop segment with both the flange and a ratchet tooth of the container shown in FIG. 12.

The container of FIG. 12 shows both an outwardly extending flange 52 and four equally spaced ratchet teeth 56 thereunder. Stop segments 38 will coact with both the ratchet teeth 56 and the annular flange 52 in the same manner as they individually coacted with them in the embodiment of FIGS. 7–9 and the embodiment of FIGS. 1–6. That is, as the cap 12 is assembled to container 22 the stop segments will pass over the container flange 52 with the upper planar surfaces 50 of the segments snapping over and engaging the bottom surfaces 54 of container flange 52 and over the ramp surfaces 60 of ratchet teeth 56. Upon rotation of the cap in an unthreading direction, the engagement of the planar surfaces 50 with the container flange 52 and the engagement of radial stop surfaces 64 of the stop segments 38 with the stop surfaces 62 of ratchet teeth 56 will prevent rotation of the band, again causing fracture of the frangible bridges 28. The windows 30 are shown as opening at the top edge of the tamper indicating band 26, but they can be alternatively completely contained within the band as shown in FIGS. 1–6.

The embodiments of the invention in which an exclusive property or privilege is claimed are defined as follows:

1. A threaded tamper indicating closure for use on a container having a threaded neck and an outwardly projecting stop means below said thread, said closure being molded as a one piece cap comprising in combination: a flat top; a first annular skirt portion depending from said top having internal threads complementary to said container threads; a second annular skirt portion having a larger diameter than said first cylindrical skirt portion and depending therefrom; a tamper indicating band spaced from the bottom of said second annular skirt portion and connected thereto by a plurality of circumferentially spaced axially extending frangible bridges; a plurality of circumferentially spaced stop segments attached to the lower portion of said band by flexible webs; and a plurality of circumferentially spaced windows formed in said band in line with said stop segments; said flexible webs permitting swinging of said stop segments inwardly and upwardly to individually engage said windows for application of said cap to said container, and upon rotation of said cap in an unthreading direction, the engagement of said stop segments with said container stop means resisting movement of said band causing fracture of said frangible bridges, leaving said tamper indicating band on said container after said cap has been removed.

2. The tamper indicating closure of claim 1 wherein said windows are completely defined between the upper and lower edges of said tamper indicating band.

3. The threaded tamper indicating closure of claim 2 wherein each stop segment has a flange which engages a lower edge of an aligned window and the inner surface of said band, and each stop segment has an upper planar surface engaging the upper edge of said aligned window.

4. The tamper indicating closure of claim 3 wherein said container stop member includes an outwardly projecting bead whereby as said cap is assembled to said container with said stop segments engaged within said windows, said stop segments will pass over said container bead and the radially inward portion of said upper planar surface will snap under said container bead.

5. The tamper indicating closure of claim 1 wherein said windows are formed with their lower edges and side edges passing through said band with the sides intersecting the upper edge of said band.

6. The tamper indicating closure of claim 5 wherein each stop segment has a flange which engages a lower edge of an aligned window and the inner surface of said band, and each stop segment has an upper planar surface engaging the lower edge of said second annular skirt portion.

7. The tamper indicating closure of claim 6 wherein said container stop member includes an outwardly projecting bead whereby as said cap is assembled to said container with said stop segments engaged within said windows, said stop segment will pass over said container bead and the radially inward portion of said upper planar surface will snap under said container bead.

8. The tamper indicating closure of claim 1 wherein said stop segments have stop surfaces in radial planes of said cap, and, as said cap is unthreaded from said container, said stop surfaces engage complementary radial stop surfaces of axially extending ratchet teeth on said container.

9. The tamper indicating closure of claim 8 wherein said container stop means includes an outwardly extending circumferential flange below said neck thread and a plurality of circumferentially spaced ratchet teeth below said flange, having radial stop surfaces and each said stop segment includes an upper planar surface, whereby as said cap is assembled to said container with said stop segment engaged within said windows, said stop segments will pass over said container ratchet teeth and over said container flange and said upper planar surface of said stop segment will snap under said bead, and as the cap is unthreaded from said container, said band will be restrained from movement by engagement of at least one of said container beads with planar surface and said radial stop surface on said container ratchet teeth with said radial stop surface on said stop segment.

10. A threaded tamper indicating closure for use on a container having a threaded neck and an outwardly projecting bead below said thread, said closure being molded as a one piece cap comprising, in combination: a flat top; a first annular skirt portion depending from said top having internal threads complementary to said container threads; a second annular skirt portion having a large diameter than said first cylindrical skirt portion and depending therefrom; a tamper indicating band spaced from the bottom of said second annular skirt portion; a plurality of circumferentially spaced axially extending frangible bridges connecting the top of said tamper indicating band to the bottom of said second annular skirt portion, a plurality of circumferentially spaced rectangular windows formed in said band between the upper and lower edges thereof, a plurality of circumferentially spaced stop segments extending radially outward from the bottom of said tamper indicating band; and a plurality of flexible webs connecting each of said stop segments to the bottom of said tamper indicating band in line with one of said rectangular windows; said flexible webs permitting the swinging of said stop segments inwardly and upwardly to individually engage said windows whereby as said cap is assembled to said container, said stop segments will pass over and snap under said container bead and upon rotation of said cap in an unthreading direction, the engagement of said stop segments with said container bead will prevent movement of said band causing fracture of said frangible bridges, leaving said tamper indicating band on said container after said cap has been removed.

11. The tamper indicating closure of claim 10 wherein said frangible bridges are in line with said stop segments.

12. The tamper indicating closure of claim 11 having eight equally spaced circumferentially disposed windows, stop segments, flexible webs and frangible bridges in line with each other.

13. A threaded tamper indicating closure for use on a container having a threaded neck and an outwardly projecting bead below said thread, said closure being molded as a one piece cap comprising, in combination: a flat top; a first annular skirt portion depending from said top having internal threads complementary to said container threads; a second annular skirt portion having a larger diameter than said first cylindrical skirt portion and depending therefrom; a tamper indicating band spaced from the bottom of said second annular skirt portion; a plurality of circumferentially spaced axially extending frangible bridges connecting the top of said tamper indicating band to the bottom of said second annular skirt portion; a plurality of circumferentially spaced open top rectangular windows formed in said band with a horizontal bottom and vertical sides intersecting the upper edge of said band; a plurality of circumferentially spaced stop segments extending from the bottom of said tamper indicating band; and a plurality of flexible webs connecting each of said stop segments to the bottom of said tamper indicating band in line with one of said rectangular windows; said flexible webs permitting the swinging of said stop segments inwardly and upwardly to individually engage a flange thereon with the bottom of said window and the inside of said tamper indicating band and an upper planar surface thereof with the lower edge of said second annular skirt portion whereby as said cap is assembled to said container, said stop segments will pass over said container bead and said upper planar surface will snap under said container bead, and upon rotation of said cap in an unthreading direction, the engagement of said stop segments with said container bead will prevent movement of said band causing fracture of said frangible bridges, leaving said tamper indicating band on said container after said cap has been removed.

14. The tamper indicating closure of claim 13 wherein said plurality of circumferentially disposed stop segments are equally spaced and said frangible bridges are equally spaced one between each adjoining rectangular windows.

15. A threaded tamper indicating closure for use on a container having a threaded neck and a plurality of equally spaced outwardly projecting ratchet teeth having radially extending stop surfaces and ramps diverging from said neck to stop surfaces, said closure being molded as a one piece cap comprising, in combination: a flat top; a first annular skirt portion depending from said top having internal threads complementary to said container threads; a second annular skirt portion having a larger diameter than said first cylindrical skirt portion and depending therefrom; a taper indicating band spaced from the bottom of said second annular skirt portion; a plurality of circumferentially spaced axially extending frangible bridges connecting the top of said tamper indicating band to the bottom of said second annular skirt portion; a plurality of circumferentially spaced rectangular windows formed in said band with a horizontal bottom and vertical sides; a plurality of circumferentially spaced stop elements extending from the bottom of said tamper indicating band; and a plurality of flexible webs connecting each of said stop segments to the bottom of said tamper indicating bands in line with one of said rectangular windows; said flexible webs permitting swinging of said stop segments inwardly and upwardly to individually engage a flange thereof with the horizontal bottom of an aligned window and the inner surface of said band and an upper planar surface thereof with a top of said aligned window to retain said segments within said band whereby as said cap is assembled to said container, said stop segments will pass over said ramp surfaces on said ratchet teeth, and upon rotation of said cap in an unthreading direction, said stop segments will engage the radial stop surfaces on said container ratchet teeth preventing rotation of said band causing fracture of said frangible bridges, leaving said tamper indicating band on said container after said cap has been removed.

16. The tamper indicating closure of claim 15 wherein said windows are completely defined between upper and lower edges of said tamper indicating band.

17. The tamper indicating closure of claim 15 wherein the sides of said windows intersect the upper edge of said band so that as said flexible webs are swung inwardly and upwardly, the upper planar surfaces thereof engage the lower edge of said second annular skirt portion which defines the top of said windows.

18. The tamper indicating closure of claim 15 wherein said container has an outwardly extending circumferential flange between said neck thread and said plurality of circumferentially spaced ratchet teeth, whereby as said cap is assembled to said container, said stop segments pass over said circumferential container flange and said upper planar surfaces will engage the bottom of said bead, and upon rotation of said cap in an unthreading direction, the engagement of said planar surfaces with said container flange and the engagement of said stop segments with the stop surfaces on said ratchet teeth will prevent rotation of said band causing fracture of said frangible bridges, leaving said tamper indicating band on said container after said cap has been removed.

19. The tamper indicating closure of claim 15 wherein said stop segments have a ramp surface so that as the cap is applied to the container said segment ramp surfaces slide over the ramp surfaces on said ratchet teeth.

*20. A threaded tamper indicating closure for use on a container having a threaded neck and an outwardly pro-*

*jecting stop means below said thread, said closure being molded as a one piece cap comprising in combination: a flat top; an annular skirt depending from said top having internal threads complementary to said container threads; a tamper indicating band spaced from the bottom of said annular skirt and connected thereto by a plurality of circumferentially spaced axially extending frangible bridges; a plurality of circumferentially spaced stop segments attached to the lower portion of said band by flexible webs; and a plurality of circumferentially spaced windows formed in said band in line with said stop segments; said flexible webs permitting swinging of said stop segments to individually engage said windows for application of said cap to said container, and upon rotation of said cap in an unthreading direction, the engagement of said stop segments with said container stop means resisting movement of said band causing fracture of said frangible bridges, leaving said tamper indicating band on said container after said cap has been removed.*

* * * * *